United States Patent
Schlüter

(10) Patent No.: US 6,459,071 B2
(45) Date of Patent: Oct. 1, 2002

(54) LASER ASSEMBLY FOR MATERIAL PROCESSING

(75) Inventor: Holger Schlüter, West Hartford, CT (US)

(73) Assignee: Trumpf Lasertechnik GmbH, Ditzingen (DE)

( * ) Notice: Subject to any disclaimer, the term of this patent is extended or adjusted under 35 U.S.C. 154(b) by 0 days.

(21) Appl. No.: 09/900,238

(22) Filed: Jul. 6, 2001

(30) Foreign Application Priority Data

Jul. 7, 2000 (DE) .......................... 100 33 071

(51) Int. Cl.$^7$ .................... B23K 26/00; B23K 26/06
(52) U.S. Cl. ...................................... 219/121.73
(58) Field of Search ...................... 219/121.6, 121.67, 219/121.68, 121.69, 121.72, 121.74, 121.73, 121.75

(56) References Cited

U.S. PATENT DOCUMENTS 4,547,651 A * 10/1985 Maruyama ............. 219/121.72
4,719,639 A    1/1988 Tulip
6,268,586 B1 * 7/2001 Stuart et al. ........... 219/121.72

FOREIGN PATENT DOCUMENTS

| DE | 3638 678 | 4/1987 |
|----|----------|--------|
| DE | 3722256  | 1/1989 |
| EP | 0 121 661 | 10/1984 |
| EP | 0428734  | 5/1991 |
| EP | 0 591 541 | 4/1994 |
| EP | 0 695 599 | 2/1996 |

* cited by examiner

*Primary Examiner*—Samuel M. Heinrich
(74) *Attorney, Agent, or Firm*—Pepe & Hazard LLP

(57) ABSTRACT

A laser beam generating assembly for materials processing includes a resonator to generate a linearly polarized laser beam, and a beam forming assembly which includes mirrors to orient the polarization plane of the laser beam in a prescribed orientation relative to the vertical and a delay plate which has its reflective surface oriented so that the polarization plane of the beam impinges thereon is at an angle of 45°. The delay plate serves to produce a polarized laser beam with a rotating polarization vector, and in particular an elliptical or circular polarization of the laser beam.

3 Claims, 3 Drawing Sheets

LASER ASSEMBLY FOR MATERIAL PROCESSING

BACKGROUND OF THE INVENTION

The present invention relates to a laser system for materials processing, with a device serving to produce a linearly polarized laser beam and with at least one delay plate for producing a polarized laser beam that has a rotating polarization vector and in particular an elliptically or circularly polarized laser beam.

In the processing of materials, for instance in cutting or welding with a linearly polarized laser beam, the processing result obtained depends on the beam vector. To minimize or eliminate this dependency, prior art laser systems are equipped with devices serving to produce a polarized laser beam with a rotating polarization vector, and preferably an elliptical or circular polarization of the laser beam. A laser system of that type, incorporating a $\lambda/4$ plate as a delay surface for the circular polarization of a linearly polarized laser beam has been described in EP-B-0 591 541. In that design, the polarization plane of the linearly polarized laser beam impinging on the $\lambda/4$ delay plate is inclined at an angle of 45° relative to the reflection plane of the delay plate. This 45° angle is obtained by means of a mirror assembly preceding the v/4 plate in the light path of the laser beam inside the prior-art laser resonator.

Prior art laser systems for materials processing are also equipped with devices for beam forming and in particular for expanding the laser beam produced; these are in the form of so-called "beam telescopes". Their purpose is to keep the angle of divergence of the laser beam reasonably small for a relatively long laser beam path. In this fashion it is possible, with minimal losses, to allow the laser beam to impinge on the optical beam-focussing element typically positioned near the processing point on the workpiece and to focus it on the latter. A laser system employing a beam telescope is described for instance in EP-A-0 428 734.

With respect to the above-mentioned prior-art designs, it is the object of this invention to minimize the number of optical elements needed in laser systems configured for materials processing and incorporating a laser beam forming device.

A specific object is to provide a laser resonator in combination with a novel beam forming device which shapes the laser beam and imports a rotating polarization vector thereto.

SUMMARY OF THE INVENTION

It has now been found that the foregoing and related objects can be readily attained by a laser beam generating assembly for producing a linearly polarized laser beam with a rotating polarization vector comprising a laser resonator for generating a linearly polarized laser beam, and a novel laser beam forming device. The beam forming device includes a delay plane having the plane of its reflective surface oriented at an angle of 45° to the vertical, and a plurality of beam-forming optical elements in the laser beam path prior to the delay plate. The optical elements have reflective surfaces angularly oriented to orient the polarization plane of the laser beam at an angle of 45° to the plane of incidence defined by the normal vector to the plane of the reflective surface of the delay plate and the oriented laser beam incident thereon, whereby the laser plate redirects the beam in a vertical direction and imparts a rotating polarization vector thereto.

In the present invention, at least one beam-forming optical element also doubles as a delay plate and at least one beam-forming optical element is utilized for the defined alignment of the polarization plane of the linearly polarized laser beam relative to the delay plate. Thus, only a relatively small number of optical elements need to be interpositioned in the light path of this type of laser system. This fact offers a number of advantages. Laser systems using this invention can be relatively small in design and their correspondingly simple construction enhances their cost effectiveness. Given the fact that laser beam forming or polarizing optical elements inherently cause light-energy losses and that optical elements of the type in question always constitute potential sources of error in the proper path alignment of the laser beam, the reduced number of optical elements in the design of this invention also entails reduced attendant energy losses and error sources in the beam alignment. The dual-purpose optical elements offer the same functional properties as those conventional optical elements whose functionalities they combine.

The characteristic features of patent claims 3 and 5 take into account the fact that, in the case of materials-processing laser systems according to this invention, it is typically laser beams with a relatively high output energy that must reach the workpiece.

BRIEF DESCRIPTION OF THE ATTACHED DRAWINGS

The appended drawing explain this invention in more detail with the aid of schematic illustrations of design examples in which.

DETAILED DESCRIPTION OF THE ILLUSTRATED EMBODIMENTS

Figure 1:
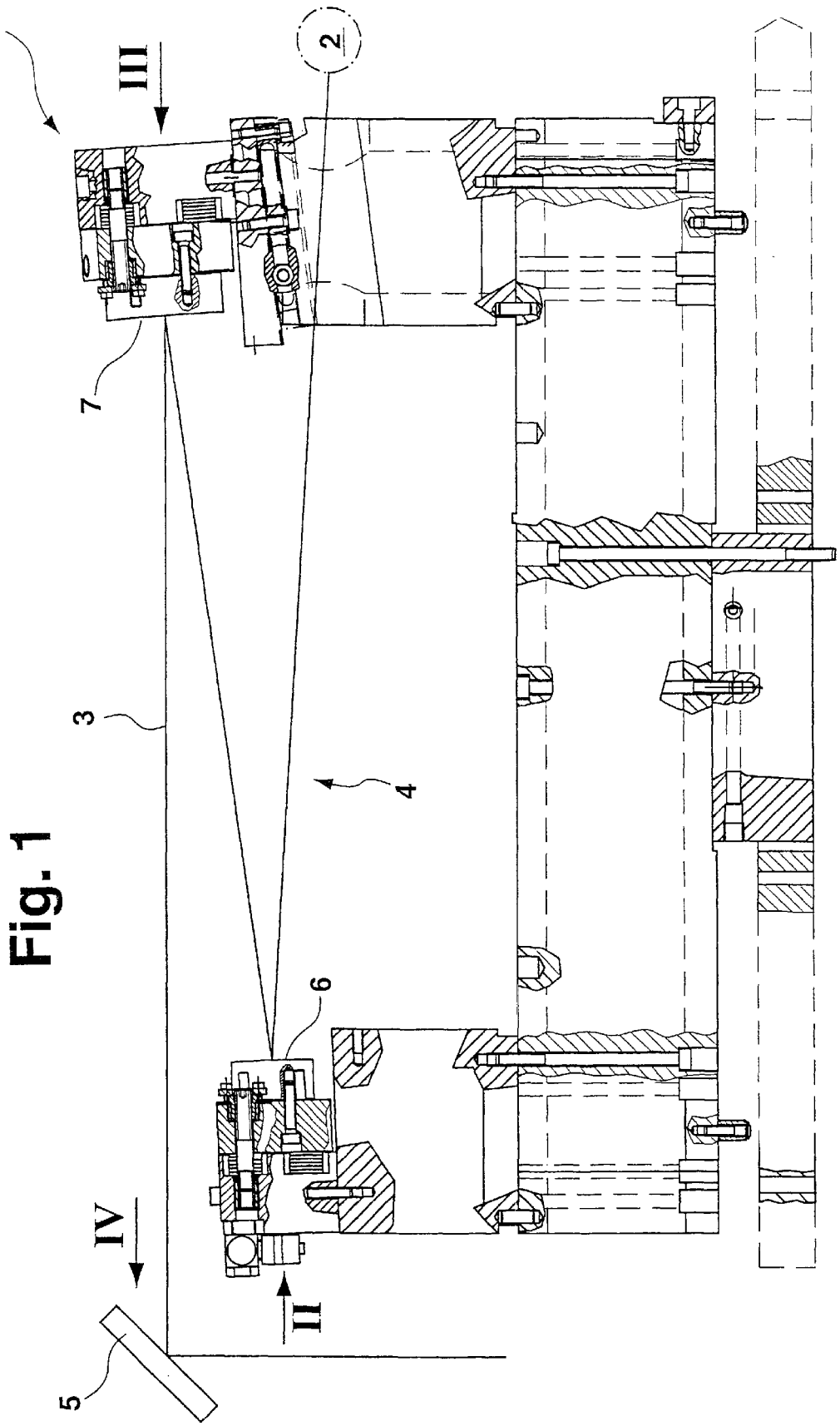
FIG. 1 shows a first embodiment of a laser system embodying the present invention with a beam telescope and a delay plate.

As shown in FIG. 1, a laser system 1 incorporates as its main components a laser resonator 2 for generating a laser beam 3 and a device for forming the laser beam 3 which is comprised of a beam telescope 4 and a delay plate 5. The beam telescope 4 is a collimating telescope with spherical mirrors 6, 7; either a Kepler or a Galilean telescope is suitable. The spherical mirrors 6, 7 permit proper functional adjustment of both the angle of divergence and the radius of the laser beam 3.

The laser resonator 2 is of a conventional design, and the laser beam emitted by it features a radially symmetrical intensity distribution and is linearly polarized. As indicated by a double arrow 8 in FIG. 2, the polarization plane of the laser beam 3 extends in the horizontal direction in the direction of expansion of the latter as viewed from the front of the spherical mirror 6.

Figure 2:
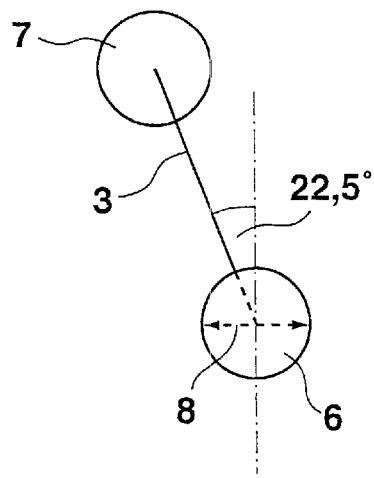
FIG. 2 is a schematic illustration of the novel beam forming device of the laser system FIG. 1 as viewed in the direction of the arrow II in FIG. 1.
Figure 3:
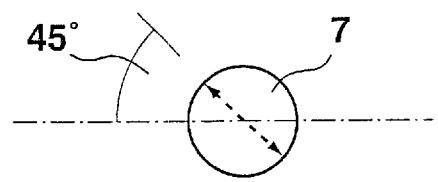
FIG. 3 is a similar schematic illustration of the laser system of FIG. 1 viewed in the direction of the arrow III in FIG. 1.
Figure 4:
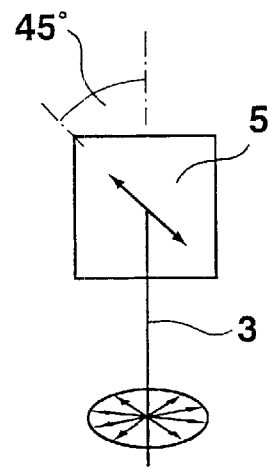
FIG. 4 is a similar schematic illustration of the laser system of FIG. 1 viewed in the direction of the arrow IV in FIG. 1.

In the manner depicted in FIG. 1, the laser beam 3 is redirected twice by the spherical mirrors 6, 7. Along this double deflection path, the laser beam 3 is oriented in a polarization plane which is inclined by 22.5° relative to the vertical line on the polarization plane of the laser beam 3 prior to the spherical mirror 6 as seen in FIG. 2. As a result of the illustrated double redirection of the laser beam 3 and the aforementioned inclination of the plane of the twice redirected laser beam 3 relative to its polarization plane prior to the spherical mirror 6, the originally horizontal polarization plane of the laser beam 3 is rotated by 45° into the position shown in FIGS. 3 and 4. With its polarization plane oriented as shown in FIGS. 3 and 4, the laser beam 3 is directed by the spherical mirror 7 onto the delay plate 5. Prior to that point, the laser beam 3 is expanded by the spherical mirrors 6, 7 in conventional fashion so as to reduce its angle of divergence. Accordingly, in the design example illustrated, the spherical mirrors 6, 7 serve as beam-forming, i.e. beam-expanding, optical elements and at the same time as optical elements for the defined alignment of the polarization plane of the linearly polarized laser beam 3 relative to the surfaces of the delay plate 5.

The delay plate 5 is a conventional birefringent quarter-wave plate, a so-called "λ/4 plate". This delay plate 5 deflects the incident laser beam 3 vertically downward by 90°. Accordingly, the reflection plane of the delay plate 5 extends in the vertical direction.

As depicted in FIG. 4, the polarization plane of the laser beam 3 is inclined between the spherical mirror 7 and the delay plate 5 by 45° relative to the reflection plane of the latter. As a result, the previously linearly polarized laser beam 3 is circularly polarized by the delay plate 5. FIG. 4 also indicates the circular polarization of the laser beam 3 reflected by the delay plate. FIGS. 1 to 4 identify the laser beam 3 only by its beam axis which is why they do not illustrate the expansion of the laser beam 3.

In traditional fashion, the expanded and circularly polarized laser beam 3 is directed to a processing station positioned downstream in the light path of the laser system 1 where it is then focussed by a focussing device onto the processing point on the object workpiece (not shown).

Figure 5:
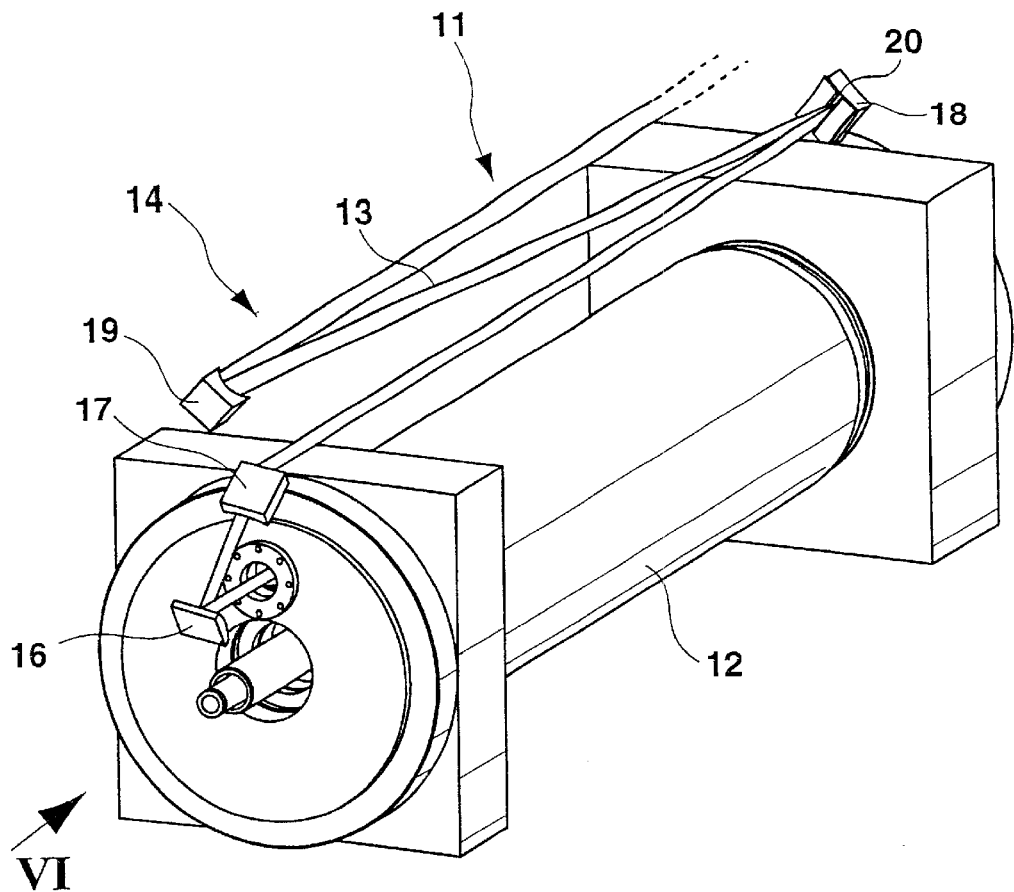
FIG. 5 shows a second embodiment of the novel laser system with a beam telescope and delay plate.
Figure 6:
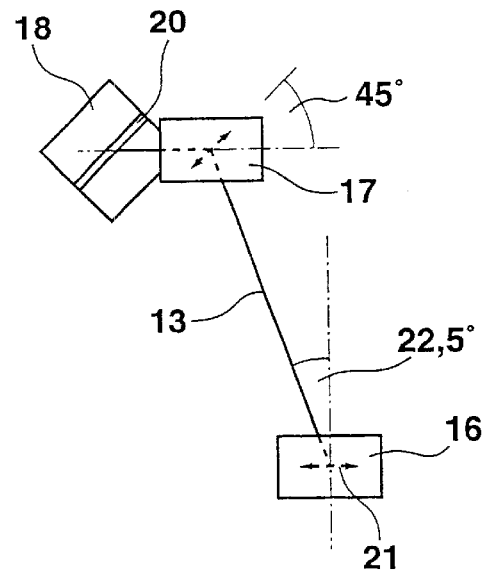
FIG. 6 is a schematic illustration of the beam forming elements of the laser system of FIG. 5 viewed in the direction of the arrow VI in FIG. 5.

A laser system 11 as illustrated in FIGS. 5 and 6 encompasses a laser resonator 12 of a conventional coaxial design serving to generate a laser beam 13, and a beam telescope 14 as the laser beam forming device. The individual constituents of the beam telescope 14, i.e. the cylindrical mirrors 16, 17, 18, 19, serve as the beam-forming optical elements.

The structural design of the beam telescope 14 is dictated by the fact that the divergence, the extension and the intensity distribution of the laser beam 13 emitted by the laser resonator 12 differ in two mutually perpendicular axial directions to such an extent that the physical conditions along the two axial directions mentioned must be accommodated independently from one another. The conditions in one of the two axial directions are occasioned by an unstable resonator, those in the other axial direction by a stable resonator.

The beam telescope 14 converts the aforementioned intensity distribution, differing in the two axial directions, into a nearly rotationally symmetrical intensity distribution. In this process the cylindrical mirrors 16, 19 handle the beam forming along the unstable axis. In the case of the example shown, they make up a Kepler telescope. By contrast, the stable axis is formed by a Galilean telescope consisting of the cylindrical mirror pair 17, 18. A conventional spatial filter 20 positioned in the intermediate focus of the Kepler telescope, i.e. the focus of the cylindrical mirrors 16, 19, serves to remove secondary lobes along the unstable axis.

As indicated in FIG. 6, the laser beam 13 exits the laser resonator 12 in linearly polarized form and with a polarization plane indicated by a double arrow that extends in the horizontal direction. Thus polarized, the laser beam 13 impinges on the cylindrical mirror 16 which reflects it at a 90° angle onto the cylindrical mirror 17. The cylindrical mirror 17 on its part then reflects the laser beam 13 at a 90° angle. In this section of the beam path, the cylindrical mirrors 16, 17 this provides a U-shaped path for the laser beam 13. This U-shaped section of the laser beam 13 extends in one plane which forms a 22.5° angle with the vertical line, i.e. with the line perpendicular to the polarization plane of the laser beam 13 in front of the cylindrical mirror 16.

By virtue of the double reflection of the laser beam 13 by the cylindrical mirrors 16, 17, the polarization plane of the laser beam, starting at its horizontal initial position in front of the cylindrical mirror 16, is rotated by a total of 45°. With its polarization plane oriented in this manner, as shown in FIG. 6, the laser beam 13 is reflected by the cylindrical mirror 17 onto the cylindrical mirror 18. The axis of the cylindrical mirror 18 and the aperture of the preceding spatial filter 20 extend in perpendicular fashion relative to each other and are inclined at a 45° angle relative to the horizontal and, respectively, vertical plane.

The laser beam 13 impinging on the cylindrical mirror 18 is reflected onto the following cylindrical mirror 19. The reflection plane of the cylindrical mirror 18 is indicated in FIG. 6 by a dash-dot line and extends in the horizontal direction, so that it is at a 45° angle relative to the polarization plane of the laser beam 13 redirected by the cylindrical mirror 17 onto the cylindrical mirror 18.

The cylindrical mirror 18 is provided with a dielectric coating. When the polarization plane of the laser beam 13 impinging on the cylindrical mirror 18 relative to the reflection plane of the cylindrical mirror is as shown in FIG. 6, this dielectric coating enables the cylindrical mirror 18 to shift the phase position of the s-polarized part of the laser beam 13 relative to its p-polarized part by one quarter of a wavelength, thus circularly polarizing the laser beam 13 which, before the cylindrical mirror 18, was linearly polarized.

In its circularly polarized form, the laser beam 13 impinges on the cylindrical mirror 19 whose axis as well is inclined at a 45° angle relative to the horizontal and, respectively, vertical plane. The cylindrical mirror 19 then directs the laser beam 13 to a focussing device in a processing station associated with the laser system 1. The laser beam 13 is ultimately focussed by the focussing device, in conventional fashion, onto the workpiece to be processed.

FIG. 5 clearly illustrates the expansion to which the laser beam 13 is subjected on its way along the path defined by the cylindrical mirrors 16, 17, 18, 19. In addition to serving as telescope-type beam expanders, the cylindrical mirrors 16, 17 also perform the defined alignment of the polarization plane of the linearly polarized laser beam 13 relative to the cylindrical mirror 18, and the cylindrical mirror 18 performs the function of a delay plate or phase shifter. The cylindrical mirror 19 of the beam telescope 14 serves only to redirect and expand the beam. Alternatively, the latter functions alone could be handled by the cylindrical mirror 18 in which case the cylindrical mirror 19 would have to be designed as the delay (or $\lambda/4$) plate.

What is claimed is:

1. A laser beam generating assembly for producing a laser beam with a rotating polarization vector comprising:
    (a) a laser resonator for generating a linearly polarized laser beam; and
    (b) a laser beam forming device including
        (i) a delay plate having the plane of its reflective surface oriented at an angle of 45° to the vertical; and
        (ii) a plurality of beam-forming optical elements in the beam path prior to said delay plate and having reflective surfaces angularly oriented to orient the polarization plane of the laser beam at an angle of 45° to the plane of incidence defined by the normal vector to the plane of the reflective surface of the delay plate and the oriented laser beam incident thereon, said delay plate redirecting the beam in a vertical direction and imparting a rotating polarization vector thereto.

2. A laser beam generating assembly in accordance with claim 1 wherein said beam-forming optical elements preceding the delay plate and aligning the polarization plane of the linearly polarized laser beam relative to the delay plate in defined orientation comprise two mirrors positioned in proximity to each other in the path of the laser beam, whereby the linearly polarized laser beam (13) impinging on the first optical element in the light path is redirected into a U-shaped path section, said U-shaped section of the laser beam path extending along a plane which together with the vertical line perpendicular to the polarization plane of the laser beam forms a 22.5° angle in front of the first optical element, and the second optical element the polarization plane of the laser beam directed onto the delay plate by the second optical element in the light path is inclined at a 45° angle relative to the reflective surface of said delay plate.

3. The laser beam generating assembly in accordance with claim 2 wherein said mirrors are spherical.

* * * * *